July 16, 1963 H. A. TOULMIN, JR 3,097,941
METHOD AND APPARATUS FOR GAS PLATING OF METAL ON GLASS FIBERS
Filed June 21, 1952 3 Sheets-Sheet 1

INVENTOR
HARRY A. TOULMIN JR.
BY Toulmin & Toulmin
ATTORNEYS

INVENTOR
HARRY A. TOULMIN JR.
BY Toulmin & Toulmin
ATTORNEYS

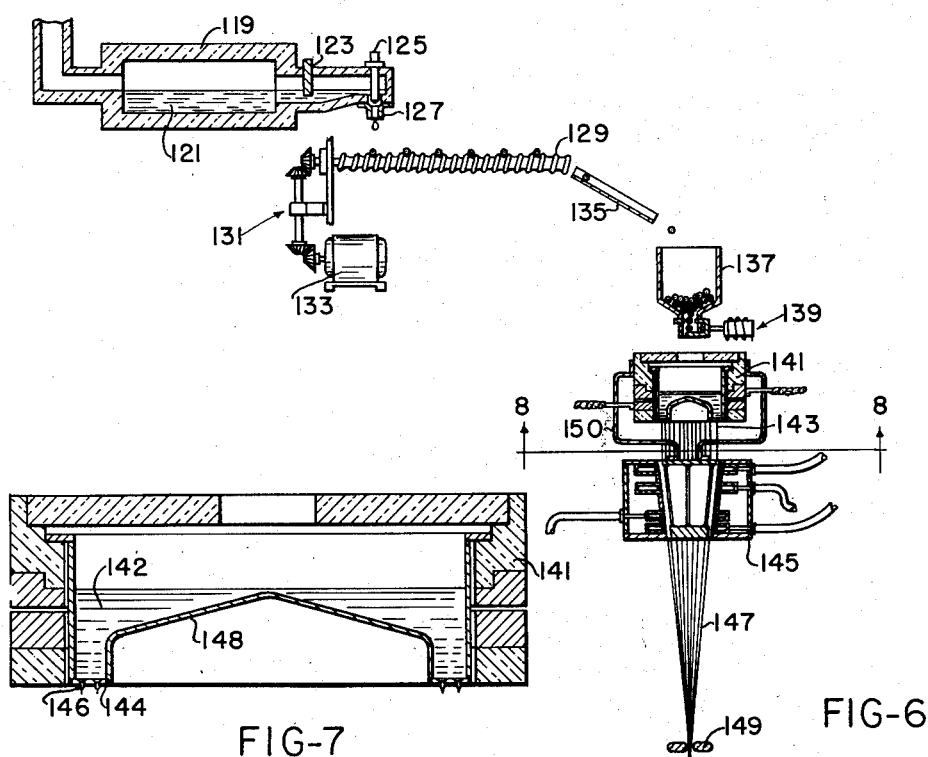
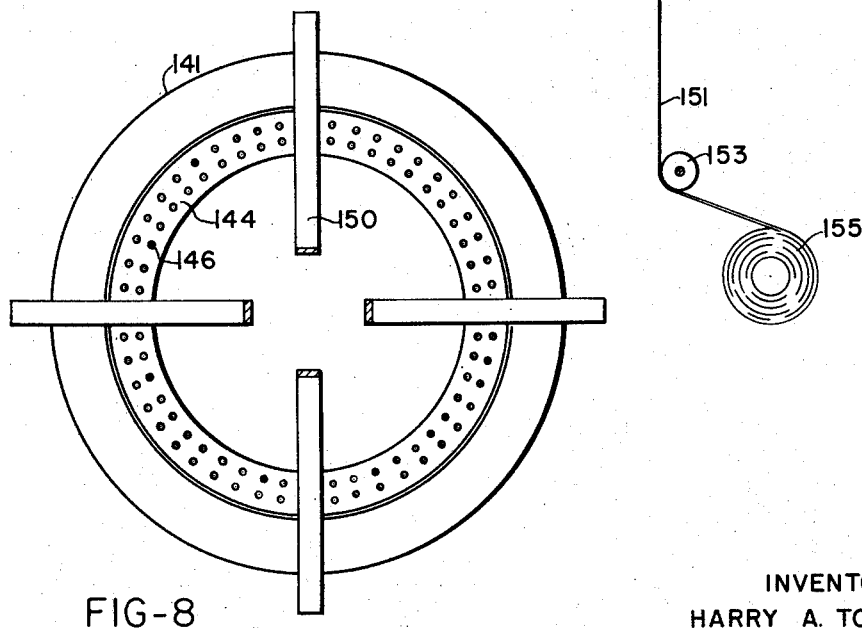
FIG-7  FIG-6
FIG-8 ll
United States Patent Office 3,097,941
Patented July 16, 1963

3,097,941
METHOD AND APPARATUS FOR GAS PLATING OF METAL ON GLASS FIBERS
Harry A. Toulmin, Jr., Dayton, Ohio, assignor, by mesne assignments, to Union Carbide Corporation, New York, N.Y., a corporation of New York
Filed June 21, 1952, Ser. No. 294,774
26 Claims. (Cl. 65—3)

This invention relates to metalized glass fibers and to a method of producing the same. The invention further relates to apparatus useful in the production of metalized filaments as the filaments are produced by the drawing of glass in a molten state.

It is accordingly a primary object of this invention to set forth a new and novel method of producing metalized filaments, which method embodies the principles of metallic deposition by the decomposition of decomposable metal bearing gaseous compounds on the hot filaments drawn from the molten glass.

It is an important object of the invention to describe a novel product attained by contacting a hot, newly drawn, glass filament with the atmosphere of a heat decomposable gas whereby metal is decomposed on the glass filament in intimate engagement therewith.

It is a principal object of the invention to describe new and novel apparatus which is particularly suitable for the production of the metalized glass filaments of this invention.

These and other allied objectives of the invention are attained by providing means for securing molten glass and for drawing the same into a fine filament at high feet per minute speeds; the filament as it is drawn, that is while it is hot and under tension, is contacted with a heat decomposable metal bearing gas, whereupon the residual heat of the newly drawn glass filament decomposes the gas resulting in the formation of a metal deposit on the glass filament. This metal deposit will be intimately associated with the glass of the filament and will be formed continuously with the apparatus of invention to produce coated filaments of substantially any desired length.

For satisfactory accomplishment of the practice of invention it is essential that the heat which effects the decomposition of the gas be drawn only from the glass filament and preferably the decomposition is effected only by the actual contact of the filament and the gas molecules. More specifically the gas must not itself be heated to decomposition temperature by thermal effect from any apparatus element, as this would occasion premature decomposition, resulting in poor deposits and a wasting of the gas. Further the filament temperature and the mode of contacting the filament with the gas must be such that the gas is not raised to decomposition temperature by heat radiated from the filament, as such radiated heat would also effect the unwanted early decomposition of the decomposable compound.

The above requirements dictated that equipment be provided to maintain the heat decomposable gas at below decomposition temperature until intimate contact between the gas molecules and the newly formed hot filament may be ahcieved. For this purpose a double walled, apertured and centrally hollow shell secured closely adjacent the source of molten glass, gas sealed from the atmosphere as described more particularly hereinafter, afford novel means for effecting the gas plating of the hot filament which passes through the centrally hollow shell. This filament passes closely adjacent small apertures of the inner wall of the shell through which the heat decomposable gas enters, and accordingly by providing means for maintaining the entering gas in a cool state, the transition to the heat decomposable temperature will be sharp and occasioned substantially only by the heat of the filament, thus rendering the apparatus particularly suitable for the metalization of the filament.

In practice a passage for the filaments through the plating chamber is defined by an outer element which is the hollow shell and an inner element which consists of spaced plates defining the limits of the gas plating chamber. The spacing formed between the plates accommodates the plating gas; the spaced plates are preferably secured together and one of the plates may then be secured to the shell to maintain the inner and outer elements in fixed spaced relation.

All of the entering gas will not generally be decomposed upon initial contact and an atmosphere of plating gas is formed internally of the shell, the molecules of which gas in their motion may continue to contact the filament in its traverse of the shell. However the temperature of this plating zone is readily controlled below that of the decomposition point of the gas and below that of the filament by simply changing the gas continually; as the continual change may result in some decomposed gas passing out of the chamber it is good practice to recover undecomposed plating gas and to recycle the same.

The temperature of the filament is an important consideration and is influenced by several factors. A prime requirement is that the filament be sufficiently hot so that it will maintain a temperature above the decomposition point of the plating gas throughout the plating zone, which zone may extend the full vertical length of the cylindrical shell. As the temperature of the filament will be materially affected by the diameter thereof and by the spacing between the shell and the source of the molten glass, these factors may be varied to control the temperature of the filament in the shell. Thus if very fine filaments are being drawn the large surface area will contribute to the rapid cooling of the filament and the shell accordingly may be spaced closely adjacent the source of the molten glass. When thicker filaments are drawn the shell may be spaced further from the source of the molten glass in order that a proper cooling of the filament may take place prior to the entry of the filament into the hollow chamber. Such control of the temperature is necessary for each heat decomposable plating gas decomposes within an optimum temperature range and accordingly the temperature of the filament in the shell should be selected in order that optimum deposition may take place.

In the process of invention the atmosphere of gas in the plating zone is as noted changed continuously and the concentration of plating gas may be controlled by employing a diluting carrier gas in conjunction with the metal bearing compound. Preferably the pressure of gas within the chamber, whether the gas is a pure metal bearing compound or a mixture of the carrier gas and metal bearing compound, is approximately atmospheric. While effective plating may be carried out at lower pressures the use of substantially atmospheric pressure offers the advantages that higher controllable quantities of metal bearing gas may be brought into contact with the filament and the plating chamber itself may be readily sealed by the employment of simple gas locks.

The metal bearing compounds which may be employed include the carbonyls, hydrides, metal bearing alkyls, carbonyl halogens and others such as the nitroxyls and the nitrosyl halides. Preferably however nickel, chromium, molybdenum and cobalt carbonyl are employed as they are readily controllable and the products of decomposition of the gases may be expelled from the system and destroyed with facility.

Carbon dioxide, helium, nitrogen, hydrogen or the gaseous products of the controlled burning of hydrocarbon gases rendered free of oxygen may be utilized as the carrier or inert gas medium. Carbon dioxide as it is readily obtainable in quantity is preferred.

The process of invention includes the metalizing of individual filaments and the combination of these filaments into a strand containing a multiplicity, for example, 204 filaments. The metal coating on each filament affords protection against the cutting of glass by glass and accordingly the abrasion and impact strength of the product of the process is high.

The invention will be more fully understood by reference to the following detailed description and the accompanying drawings wherein:

FIGURE 6 is a schematic elevational view partially in section indicating the complete process of invention;

FIGURE 7 is an enlarged sectional view showing the source of molten glass; and

FIGURE 8 is a view taken on line 8—8 of FIGURE 6.

Figure 1:
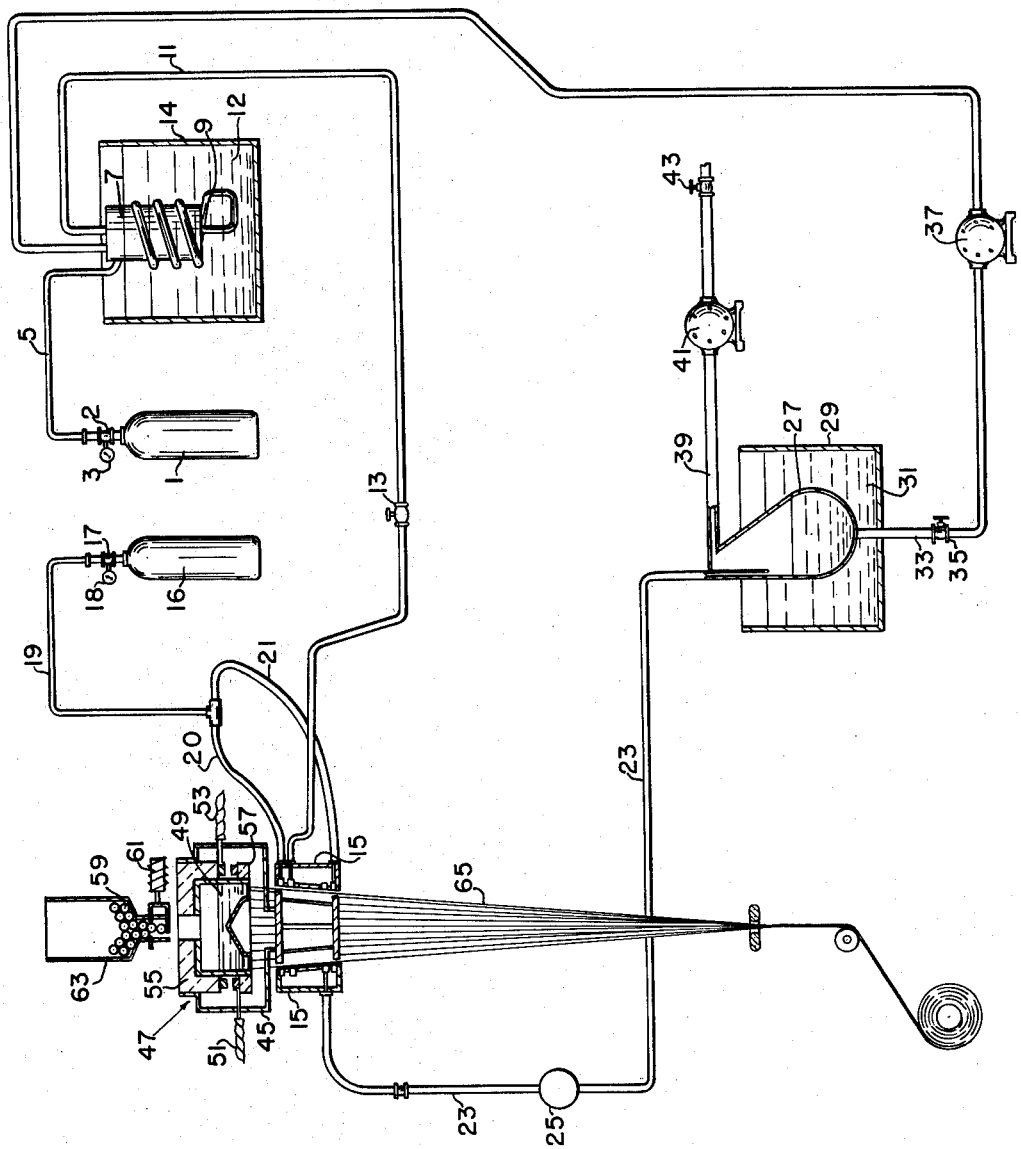
FIGURE 1 is a diagrammatic elevational view of a complete system for the continuous drawing and plating of glass filaments.

Referring to the drawings, there is shown in FIGURE 1 at 1 a cylinder containing carbon dioxide under pressure, the cylinder being equipped with a valve 2 and a gauge 3 for indicating the flow of gases through a line 5 terminating in a carburetor 7 as at 9. Secured to the upper end of the carburetor 7 is an exit conduit 11 provided with a valve 13 and terminating in a hollow double walled cylindrical shell 15. Carburetor 7 may be immersed in oil 12 in tank 14 and where required the oil may be heated to effect adequate generation of the metal bearing compound contained within the carburetor. However, in the present instance the apparatus is to be described in connection with the coating of the filament with nickel by means of nickel carbonyl and this compound is sufficiently vaporizable at room temperature as not to require heating means at the carburetor. Thus the flow of carbon dioxide gas from the cylinder 1 will sufficiently lower the vapor pressure over the nickel carbonyl to effect continuous volatilization of the same in sufficient quantity for the purpose of the invention.

A second cylinder 16 of carbon dioxide provided with a valve 17 and a gauge 18 is connected through line 19 to branch conduits 20, 21 which also terminate within shell 15. Extending outwardly of shell 15 in the lower left hand portion of the illustration (FIGURE 1) is a conduit 23 provided with a vacuum pump 25 which draws gases from the shell 15 and expels them towards a trap 27 contained in a tank 29 and surrounded by a cooling material such as Dry Ice 31. Trap 27 is provided at the lower extremity thereof with a conduit 33 having a valve 35 through which condensed metal bearing compound may be passed and pumped by motor 37 to carburetor 7 for reuse in the system of invention.

Line 23 terminates in the upper portion of trap 27 and a conduit 39 provided with a pump 41 receives uncondensed gaseous material and forces the same through valve 43 when the same is open to the atmosphere where gases of decomposition, such as carbon monoxide, may be readily burned.

The chamber 15 is secured by brackets indicated in FIGURE 1 at 45 to an electrically heated furnace 47 containing a pool of molten glass 49 and heated by a current passing through leads 51, 53. Preferably elements 51, 53 represent an induction coil which surrounds a pool of glass 49 having a circular cross-section as more uniform heating of the glass is attained in this manner. Alternatively however resistance heating of the platinum crucible containing glass 49 may be employed. The furnace is heat insulated as indicated at 55, 57 and is supplied with raw glass in the form of balls 59 through a feeding mechanism 61 operable to control the ball flow through hopper 63. The glass feeding, drawing and plating elements 65 which effect the formation of metalized filaments 65 are described more particularly in conjunction with other figures. Thus in FIGURES 2 to 5, inclusive, the structure of the cylindrical hollow shell 15 is set forth in detail.

Figure 2:
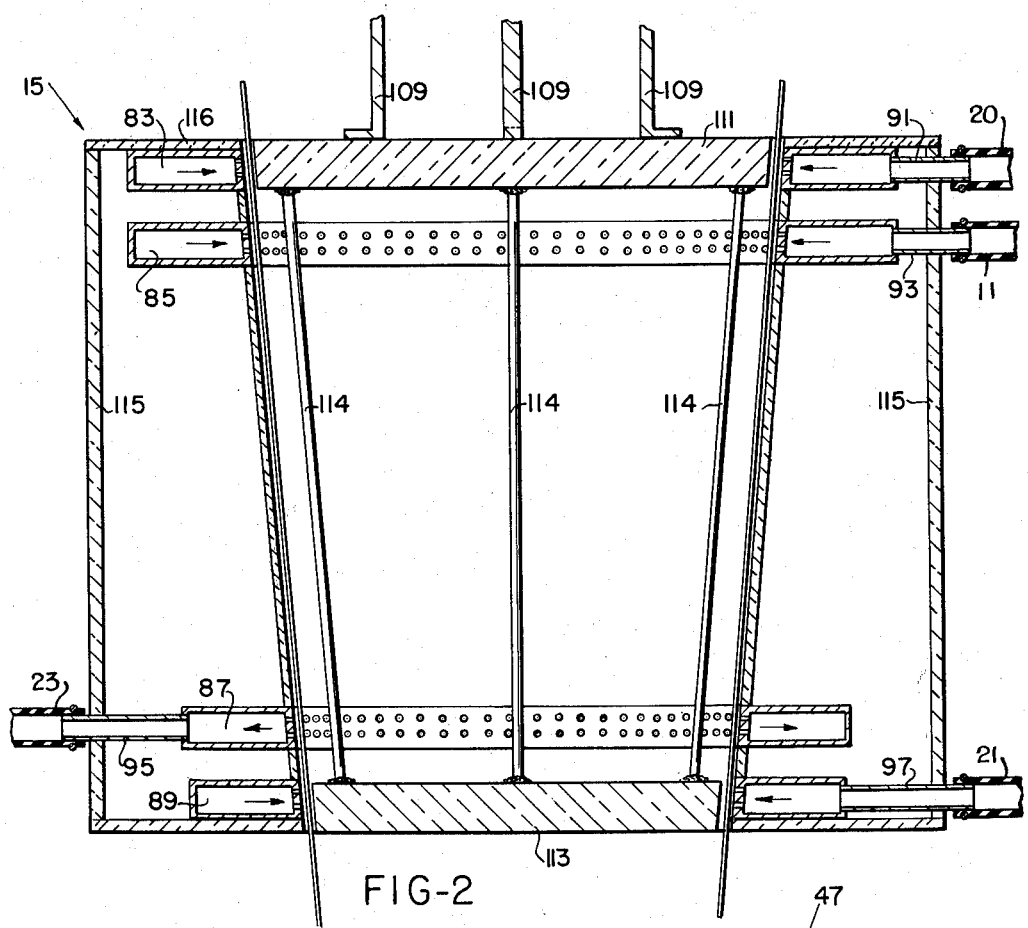
FIGURE 2 is a sectional view of the plating chamber.
Figure 3:
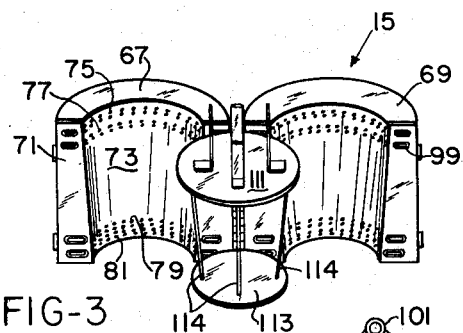
FIGURE 3 is a perspective view illustrating the manner of forming the plating chamber.

Referring particularly to FIGURE 3 it will be noted that shell 15 comprises two semi-cylindrical portions 67, 69. Each cylindrical portion is hollow and closed at the ends by a plate as at 71. The internal wall 73 formed by the two semi-cylindrical portions is provided with sets of apertures as at 75, 77, 79 and 81. Each aperture set preferably consists of at least two rows as indicated in FIGURES 2 and 3. Each set of apertures as indicated more clearly in FIGURE 2 opens into an annular chamber or cavity as at 83, 85, 87 and 89 and three of these cavities are in turn each connected with a source of gas pressure, respectively, through conduits 91, 93 and 97, which conduits extend externally of the shell. Conduit 95 is connected to exhaust line 23 of FIGURE 1. Apertures 77 which convey the plating gas into the chamber are preferably somewhat smaller than the others and are shaped to effect a jet of the gas into the chamber.

Figure 5:
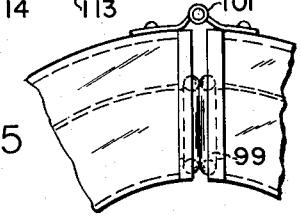
FIGURE 5 is a schematic plan view illustrating the manner of securing together portions of the plating chamber.

As shown most clearly in FIGURE 3 the conduits of each semi-cylindrical portion 67, 69 terminate in a sealing member which may be, for example, an O ring as indicated at 99. When the portions 67, 69 are brought together to form a cylinder the O rings 99 are compressed together to effectively seal the interior of the annular conduits from the atmosphere. (As shown in FIGURE 5, the O rings 99 extend beyond the faces of the semi-cylindrical portions, the conduits themselves are still sealed although an opening then exists between the portions the size of which opening is dependent upon the extension of the O rings beyond the faces. With chamber operation at atmospheric pressure as set out hereinbefore the gas within the chamber serves as a lock and prevents entry of air.

Figure 4:
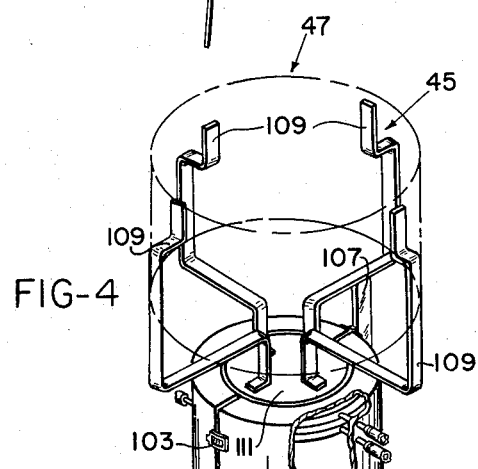
FIGURE 4 is a perspective view indicating one mode of securing the gas plating chamber to the source of molten glass.

As shown in FIGURE 5 the portions are mechanically connected by a simple door hinge arrangement indicated at 101 and in the closed position are securely fastened together by latches 103 and 105 as shown in FIGURE 4. Also as shown in FIGURE 4 the hinge 101 is secured to a support 107 which in turn is fastened to bracket 45. Bracket 45 consists of four spring members 109 each of which is secured to a plate 111 and each of which extends upwardly to engage furnace 47 as indicated in FIGURES 1 and 4. Preferably members 109 are of a heat insulating material in order that as little heat as possible will be conducted to plate 111. Accordingly bracket 45 is a securing means which secures the plate 111 to the furnace 47 and support 107 affixes the securing means or bracket 45 to a walled porion or to the hinge 107 of the walled portion.

Plate 111 is spaced from a second and smaller plate 113 by rod members 114 which extend the full length of the gas plating chamber, as may be clearly seen from FIGURE 3, when the semi-cylindrical portions 67, 69 are closed upon each other.

The rods 114 are shown in FIGURE 2 rigidly secured as by a weld to each of plates 111 and 113.

It is necessary to the operation of the device that the filament passing between the members 111 and 113 should be at a higher temperature than the surroundings. Under this condition plating gas will be deposited directly on the filament and decomposition will not occur in the surrounding areas if the temperature thereof is kept low. Accordingly it is desirable that the walls 115 and the upper portions 116 either be of heat insulating material or be surrounded with heat insulating material in order to protect the interior of the plating chamber from heat radiation. Alternatively, the chambers which carry the gas, that is 83, 85, 89, may be suitably heat insulated from the remainder of the body of the plating chamber, but in this case also the central portion of the plating chamber must be protected from the effects of radiated heat.

The gas traps at either end of the hollow cylinder as shown in FIGURE 2 not only prevent the escape of gas from the interior of the plating chamber, but tend also to maintain the gas within the chamber somewhat cool, as for example, when gas is passed through the conduit 83 into the plating chamber adjacent the member 111 a gas seal is formed which prevents air from the outside from entering. Also, since there will be an excess quantity of gas passing from the member 83 into the plating chamber, some of this gas will enter the chamber and while it dilutes the plating gas in the same to some slight extent its more beneficial effect is to maintain the gas within the plating chamber cool and below the decomposition point of the heat decomposable compound. A similar seal is formed between the conduit 89 and the member 113 at the base of the plating chamber.

A completely operable unit for the production of the filament from the raw glass is illustrated in FIGURE 6. Thus the forebay 119 contains molten glass 121 which connects by means of slide valves 123, 125 with an aperture 127 and whereby glass is passed selectively from the forebay to the aperture. Positioned directly below the aperture is a ball-forming or sphere-forming mechanism 129 driven through gearing 131 by motor 133 and associated with chute 135 which empties into bin 137. Accordingly when the hot molten glass passing aperture 127 forms a spherical bead as indicated and drops onto the rotating mechanism 129 a glass sphere is formed which cools as it travels the length of the mechanism 129 and accordingly is deposited on the chute 135 whereupon it moves to the bin 137. Thereafter the balls are fed by suitable automatic control means indicated generally at 139 into furnace 141 and are exuded therefrom as strands 143, which pass into the plating chamber 145 and are emitted therefrom as metallic coated filaments 147. The strands 147 are grouped together by passing over pad 149 which may or may not be supplied with lubricating material as desired, and the formed strand 151 is tensioned over roller 153 and unwound as at 155.

In order that the invention will be most fully understood in its preferred form there is shown in FIGURES 7 and 8 a most suitable means for effecting the formation of the filament. Thus in FIGURE 7 the furnace 141 containing the molten glass 142 is provided in the base plate 144 on the outer periphery thereof only with apertures 146 which as indicated may be two rows, concentric and circular. The molten glass exuding from these apertures forms a substantially spherical globule from which the filament 143 may be readily drawn in a very fine and a very uniform manner.

It will be noted that the furnace is recessed as at 148 in order that the glass which approaches the apertures may be very uniformly heated, as temperature plays a very critical part in the drawing of the filaments, and where the ultimate filament is to be used in electrical applications as in the present instance a uniformity must be maintained such that the filament itself does not vary any more than plus or minus 20% of the normal.

It will also be noted in the present instance that the plating chamber 145 is supported from the furnace itself by support members 150 as shown most clearly in FIGURE 8.

In the usual method of operation the glass 142 contained in the platinum or platinum-iridium pot having the base plate 144 of similar material is heated to a temperature of about 2800° F. and the glass at the nipples of plate 144, due to radiation losses, etc., assumes a temperature of about 2250° F. Under this condition the glass as it is drawn at high speeds of about 2 miles per minute from the molten glass drop formed at the nozzle aperture is attenuated into a fine strand which cools quickly in the air due to the large surface area thereof exposed. The cooling glass filament which may also if desired be cooled by a jet of a gas as nitrogen is passed, while still above the temperature of the heat decomposable gaseous metalbearing compound, into the plating chamber, whereupon the jet stream of plating gas and carrier gas contacts the drawn filament depositing metal thereon. Thereafter throughout the traverse of the length of the plating chamber undecomposed molecules of plating gas within the chamber continually contact the filament depositing more metal, the action in this respect being assisted by the metal deposited directly from the jet stream.

As will be understood by one skilled in the art the plating chamber is flushed free of air prior to the start of the filament movement by passing carbon dioxide into the chamber and withdrawing it through conduit 95 and line 23; the plating chamber is then filled with a metalbearing gas and an atmosphere of carbon dioxide is maintained in the passageway between the plates and the shell 15 throughout the process to form upper and lower gas seals. Carbon dioxide, or equivalent inert gas, for these seals is supplied through annular means 83 and 89 which are connected to pipe lines 20 and 21 respectively.

Utilizing nickel carbonyl as the metal-bearing gas the position of the plating chamber and surrounding temperature conditions are preferably adjusted so that the filament enters the plating chamber at not more than 400° F. and leaves at not less than 200° F. In this event plating will take place over the complete traverse of the chamber. Plating may however be inhibited after a given length of traverse by suitably selecting the entering temperature and that of the gas within the chamber, for after the filament is cooled below 50° F. negligible nickel coating will take place.

With other metal-bearing gases the optimum plating conditions for a given desired result may suitably be selected. For example, utilizing copper acetylacetonate the preferred range is 650–1000° F. and with nickel acetylacetone at the range is 600–800° F.

The completed filaments, wound as at 155, will have a fine sheen and are suitable for use in fabrics of all types as well as in industrial applications.

It should also be particularly noted that for many glasses, and particularly commercial E glass, the temperature ranges set forth above for the plating conditions are also an optimum range for the filaments since the glass filaments in this temperature have optimum strength characteristics. Thus E glass is known to increase in strength up to about 400° F. and is within practical working limits at 1000° F. Accordingly the jet of impinging gas contacts the glass while it is in an optimum condition and trouble free operation of the apparatus and a product of superior quality are assured.

Also it should be particularly noted that since in the process of invention the glass core is metalized before the drawn filament has cooled to room temperature that no opportunity exists for the absorption of moisture by the glass filament and accordingly no interference with the bonding of the glass and metal is experienced from this source.

It will be understood that this inevntion is susceptible to modification in order to adopt it to different usages and conditions and accordingly, it is desired to comprehend such modifications within this invention as may fall within the scope of the appended claims.

I claim:

1. In a method of producing metal sheathed glass filaments the steps of continuously drawing molten glass into the form of a plurality of filaments, subjecting said filaments while in the drawing condition and at a temperature in the range of decomposition of a gaseous heat decomposable metal-bearing compound, and continuously drawing the filaments thus heated to said temperature range and simulaneously contacting the same with a non-oxidizing atmosphere of a heat decomposable metal-bearing compound to effect deposition of metal on said glass filaments.

2. In a method of producing metal sheathed glass filaments the steps of continuously drawing molten glass into the form of a plurality of filaments, subjecting said filaments while in the drawing condition and at a temperature in the range of decomposition of a heat gaseous heat decomposable metal-bearing compound, and continuously drawing the filaments while hot at a high feet per minute speed and simultaneously contacting the same with a non-oxidizing atmosphere of a heat decomposable metal-bearing compound which atmosphere is at a lower temperature than the filament to effect deposition of metal on said glass filaments.

3. In a method of producing nickel sheathed glass filaments the steps of continuously drawing molten glass into the form of a plurality of filaments, subjecting said filaments while in the drawing condition and at a temperature in the range of decomposition of a gaseous heat decomposable nickel-bearing compound, and continuously drawing the thus hot filaments and simultaneously contacting the same with a non-oxidizing atmosphere of a heat decomposable nickel-bearing compound which atmosphere is at a lower temperature than the filament to effect deposition of nickel on said glass filaments.

4. In a method of producing a copper sheathed glass filament the steps of continuously drawing molten glass into the form of a filament, cooling the filament while in the drawing condition to a temperature in the range of decomposition of a gaseous heat decomposable copper bearing compound, and while continuously drawing the filament simultaneously contacting the same in said temperature range with a non-oxidizing atmosphere of a heat decomposable copper bearing compound which atmosphere is at a lower temperature than the filament to effect deposition of copper on said glass filament.

5. In a method of producing a nickel sheathed glass filament the steps of continuously drawing molten glass into the form of a filament, cooling the filament in air while in the drawing condition to a temperature between about 600° F. to 800° F., and while continuously drawing the filament at a high feet per minute speed passing the filament into an enclosed plating zone from which air is excluded and simultaneously contacting the same in said temperature range with a non-oxidizing atmosphere of a gaseous nickel acetylacetonate to effect deposition of said nickel on said glass filament.

6. In a method of producing a copper sheathed glass filament the steps of continuously drawing molten glass into the form of a filament, cooling the filament in air while in the drawing condition to a temperature between about 600° F. to 1000° F., and while continuously drawing the filament at a high feet per minute speed passing the filament into an enclosed plating zone from which air is excluded and simultaneously contacting the same in said temperature range with a non-oxidizing atmosphere of a gaseous copper acetylacetonate which atmosphere is at a lower temperature than the filamentt to effect deposition of said copper on said glass filament.

7. A method of producing a strand of metal sheathed glass filaments comprising the steps of continuously exuding molten glass into a series of separate filaments and subjecting the filaments while separately drawing the same to a temperature in the range of decomposition of a heat decomposable metal bearing compound, continuously drawing the filaments while heated to said temperature passing the filament into an enclosed plating zone from which air is excluded and simultaneously contacting the same in said temperature range with a non-oxidizing atmosphere of a gaseous heat decomposable metal bearing compound which atmosphere is at a lower temperature than the filament to effect deposition of metal on each of said filaments, and continuously gathering the filaments into a single strand while winding the same at high speed.

8. A continuous method of producing a strand of metal sheathed glass filaments as drawn directly from a molten glass mass which comprises the steps of heating a pot containing a body of glass by induction means to secure a uniform molten glass body, continuously exuding molten glass into a series of separate filaments and subjecting the filaments to a temperature in the range of decomposition of a gaseous heat decomposable metal bearing compound, and continuously drawing the filaments while simultaneously contacting the same with a gaseous heat decomposable metal bearing compound to effect deposition of metal on each of said filaments, and continuously gathering the filaments into a single strand while winding the same at high speed.

9. A continuous method of producing a strand of nickel sheathed glass filaments as drawn directly from a molten glass mass which comprises the steps of heating a pot containing a body of glass by induction means to secure a uniform molten glass body, continuously exuding molten glass into a series of separate filaments and subjecting the filaments to a temperature in the range of decomposition of a gaseous heat decomposable nickel bearing compound, and continuously drawing the filaments while simultaneously contacting the same with a gaseous heat decomposable nickel bearing compound to effect deposition of nickel on each of said filaments, and continuously gathering the filaments into a single strand while winding the same at high speed.

10. A method of producing a strand of copper sheathed glass filaments comprising the steps of heating a pot containing a body of glass by induction means to secure a uniform molten glass body, continuously exuding molten glass into a series of separate filaments and cooling the filaments to a temperature in the range of decomposition of a gaseous heat decomposable copper bearing compound, and continuously drawing the filaments simultaneously contacting the same with a gaseous heat decomposable copper bearing compound to effect deposition of copper on each of said filaments, and continuously gathering the filaments into a single strand while winding the same at high speed.

11. Apparatus for the continuous coating of glass filaments with metal deposited from a gaseous metal bearing compound comprising pot means for holding a body of molten glass, means to heat the pot to retain a body of glass therein molten, said pot means having spaced apertures therein, means for drawing a glass filament from each said aperture, chamber means supported below said pot and apertures, said chamber means having a wall and a plate defining a passage therethrough through which said filaments may pass in spaced relation, conduit means in said chamber forming a gas inlet and outlet, means to supply a heat decomposable metal bearing compound to said conduit means and chamber to contact a glass filament in its passage therethrough, and means to maintain said gaseous compound cool prior to said contact with said filament.

12. In combination, pot means for holding a body of molten glass, means to draw glass filaments from a body of molten glass in said pot means, means to heat said glass in said pot means to retain said body molten, gas plating means supported below said pot means for the metal plating of filaments drawn from said pot means, said plating means comprising an outer double walled shell surrounding an inner spacing of the shell and having spaced plates defining the end limits of the spacing, said plates and inner wall of the shell forming a passageway therebetween for said filaments, said shell having thereinto inlet and outlet conduits and also having in the interior wall thereof apertures communicating with the spacing and with the conduits for the passage of plating gases inwardly and outwardly of the spacing.

13. In combination, pot means for holding a body of molten glass and a gas plating chamber below said pot for the metal plating of glass filaments drawn from said pot, said chamber comprising an outer double walled shell having conduits therein and an inner hollow portion of the shell connected with said conduits and having spaced plates therein defining the limits of said chamber, said plates and shell forming a passageway therebetween for said filaments, securing means securing one of said plates to said pot means, means affixing said securing means to said shell, and means for drawing said glass filaments from said pot and through said chamber.

14. In combination, pot means for holding a body of molten glass and a gas plating chamber below said pot for the metal plating of glass filaments drawn from said pot, said chamber comprising an outer double walled apertured shell and an inner hollow portion of the shell having spaced plates therein defining the limits of the chamber, said plates and shell forming a passageway for said filaments, means securing the upper of said plates to said pot means, means affixing said securing means to said shell, and means for drawing said glass filaments from said pot and through said chamber.

15. In a gaseous plating apparatus, a gas plating chamber for the metal plating of a multiplicity of glass filaments as they are drawn from a body of molten glass comprising outer and inner elements defining a passage therebetween and forming an interior spacing said outer element having means therein for the passage of gas through said passage to said spacing, means for supplying gaseous metal plating material to said interior spacing, means external of each element securing said inner element to said outer element to hold said inner element in position and maintain said passage, and means for collecting and moving said filaments in unison through said plating chamber and therefrom to storage means.

16. In a gaseous plating apparatus, a gas plating chamber for the metal plating of a multiplicity of glass filaments as they are drawn from a body of molten glass comprising outer and inner elements defining a passage therebetween and forming an interior spacing, means for supplying gaseous metal plating material to said interior spacing, said inner element comprising a pair of spaced plates limiting said spacing, means securing one of said plates to said outer element to hold said inner element in position and maintain said passage and means for collecting and moving said filaments in unison through said plating chamber and therefrom to storage means.

17. A gas plating chamber comprising a pair of semi-cylindrical members hinged together to define an interior spacing, each member comprising an element having double walls, the inner wall of each member having apertures therein for communicating with the interior spacing, semi-annular cavity means in said semi-cylindrical members between said walls communicating with said apertures, conduits connected to each of said semi-annular cavity means, the ends of the semi-annular cavities becoming sealed upon closure of said semi-cylindrical members, a member supported centrally within said interior spacing and forming with said inner walls a passage through said chamber coextensive with said walls, said member comprising spaced plates one of which is adjacent each end of the chamber and whereby a gas pressure may be maintained between each of said plates and the said inner wall to seal the interior of said chamber from the air.

18. In a method of producing a metal sheathed glass filament, the steps of, continuously drawing molten glass into the form of a filament, continuously drawing and cooling the filament to a temperature within the range of decomposition of a heat decomposable gaseous metal-bearing compound, and simultaneously contacting said heated filament with said heat-decomposable metal compound to effect deposition of metal on the glass filament as the same is drawn from said molten glass.

19. In a method of producing gaseous metal plated glass fiber, the step (a) of drawing a filament of glass continuously from a molten glass mass; the step (b) of moving said filament while in heated condition, as it is drawn, into contact with a metal bearing heat decomposable gaseous compound; and the step (c) of depositing said metal, under non-oxidizing conditions, upon the filament as it moves and as the temperature of the filament decreases.

20. In a method of plating a glass filament with a heat decomposable metal bearing compound as said filament is drawn, the step (a) of applying a heat decomposable gaseous metal compound to the filament as drawn from a molten glass mass; and the step (b) of regulating the temperature of the respective metal-bearing gas and filament to adjust it within a range to cause decomposition of said gaseous metal compound and deposition of the metal constituent of said gaseous metal compound on the filament in the absence of oxide formation.

21. In a method of plating a glass filament with a heat decomposable metal bearing compound as said filament is drawn, the step (a) of applying gaseous compound to the filament; and the step (b) of regulating the temperature of the respective metal bearing gas and filament to adjust it within a range to cause decomposition of said gaseous metal compound and deposition of the metal in the absence of oxide formation on the filament and concurrently during drawing and attenuating of the filament.

22. In a method of producing metal sheathed glass filaments the steps of continuously drawing molten glass into the form of a plurality of filaments, cooling the filaments in air while in the drawing condition to a temperature in the range of decomposition of a gaseous heat decomposable metal bearing compound, and continuously drawing the filaments and passing said filaments into an enclosed plating zone from which air is excluded, and simultaneously contacting the same while within said temperature range with a non-oxidizing atmosphere of a heat decomposable metal-bearing compound which atmosphere is at a lower temperature than the filaments to effect deposition of metal on said glass filaments.

23. In a method of producing a nickel sheathed glass filament, the steps of continuously drawing molten glass into the form of a filament, cooling the filament in air while in the drawing condition to a temperature between about 200° F. to 400° F., and while continuously drawing the filament at a high feet per minute speed, passing the filament into an enclosed plating zone from which air is excluded simultaneously contacting the same in said temperature range with a non-oxidizing atmosphere of a heat decomposable nickel bearing compound which atmosphere is at a lower temperature than the filament to effect deposition of said nickel on said glass filament.

24. In a method of producing a nickel sheathed glass filament, the steps of continuously drawing molten glass into the form of a filament, cooling the filament in air while in the drawing condition to a temperature between about 200° F. to 400° F., and while continuously drawing the filament at a high feet per minute speed, passing the filament into an enclosed plating zone from which air is excluded, simultaneously contacting the same in said temperature range with a non-oxidizing atmosphere of a gaseous nickel carbonyl to effect deposition of said nickel on said glass filament.

25. In a method of plating a glass filament with a heat decomposable metal bearing compound, the step (a) of applying gaseous compound to the filament; and the step (b) of regulating the temperature of the respective metal bearing gas and filament to adjust it within a range to cause decomposition of said gaseous metal compound and deposition of the metal in the absence of oxide formation on the filament and concurrently during drawing and attenuating of the filament.

26. A continuous method for producing a coated refractory fiber comprising the steps of drawing a continuous, moving, pure fiber from a molten refractory material, surrounding the drawn fiber with a non-oxidizing gas, and applying at least one coating of an inorganic substance to said moving, pure fiber.

References Cited in the file of this patent

UNITED STATES PATENTS

| | | |
|---|---|---|
| 828,155 | Vittenet | Aug. 7, 1906 |
| 2,005,580 | Ferre | June 18, 1935 |
| 2,142,717 | Dreyfus et al. | Jan. 3, 1939 |
| 2,304,182 | Lang | Dec. 8, 1942 |
| 2,375,178 | Ruben | May 1, 1945 |
| 2,402,924 | Snyder | June 25, 1946 |
| 2,453,864 | Schlehr | Nov. 16, 1948 |
| 2,462,806 | Danner | Feb. 22, 1949 |
| 2,491,889 | Bennett et al. | Dec. 20, 1949 |
| 2,577,936 | Waggoner | Dec. 11, 1951 |
| 2,616,165 | Brennan | Nov. 4, 1952 |

FOREIGN PATENTS

| | | |
|---|---|---|
| 849,842 | France | Aug. 28, 1939 |